US010281284B2

(12) United States Patent
Duan et al.

(10) Patent No.: US 10,281,284 B2
(45) Date of Patent: *May 7, 2019

(54) HYBRID ROAD NETWORK AND GRID BASED SPATIAL-TEMPORAL INDEXING UNDER MISSING ROAD LINKS

(71) Applicant: International Business Machines Corporation, Armonk, NY (US)

(72) Inventors: Ning Duan, Beijing (CN); Peng Gao, Beijing (CN); Peng Ji, Nanjing (CN); Xiao Bo Li, Ningbo (CN); Zhi Hu Wang, Beijing (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,036

(22) Filed: Sep. 6, 2016

(65) Prior Publication Data
US 2017/0010123 A1    Jan. 12, 2017

Related U.S. Application Data

(63) Continuation of application No. 15/055,681, filed on Feb. 29, 2016, now Pat. No. 9,546,872, which is a
(Continued)

(51) Int. Cl.
*G06F 17/30* (2006.01)
*G01C 21/32* (2006.01)
(Continued)

(52) U.S. Cl.
CPC ............ *G01C 21/32* (2013.01); *G01C 21/00* (2013.01); *G01C 21/3667* (2013.01);
(Continued)

(58) Field of Classification Search
CPC ......... G06F 17/30321; G06F 17/30241; G06F 17/30477; G01C 21/32; G01C 21/3667
See application file for complete search history.

(56) References Cited

U.S. PATENT DOCUMENTS 6,812,888 B2   11/2004   Drury et al.
7,782,179 B2    8/2010   Machii et al.
(Continued)

FOREIGN PATENT DOCUMENTS

CN    102997928 A    3/2013
CN    103106280 A    5/2013

OTHER PUBLICATIONS

Chang et al.; "An Efficient Indexing Scheme for Moving Objects' Trajectories on Road Networks"; WAIM 2006, LNCS 4016, 2006; pp. 13-25; Springer-Verlag Berlin Heidelberg.
(Continued)

*Primary Examiner* — James Trujillo
*Assistant Examiner* — Jessica N Le
(74) *Attorney, Agent, or Firm* — Alexa L. Ashworth; Brian M. Restauro

(57) ABSTRACT

Embodiments of the present invention provide efficient and dynamic systems and methods for building a hybrid road network and grid based spatial temporal index to handle big trajectory data. Embodiments of the present invention can be used to satisfy the issue of low indexing and compression rate of big trajectory data, and to improve the efficiency of index queries, while also providing a mechanism to account for missing road links in a map.

10 Claims, 7 Drawing Sheets

Related U.S. Application Data continuation of application No. 14/791,576, filed on Jul. 6, 2015, now Pat. No. 9,551,583.

(51) Int. Cl.
  *G01C 21/00*  (2006.01)
  *G05D 1/02*  (2006.01)
  *G01C 21/36*  (2006.01)

(52) U.S. Cl.
  CPC ..... *G05D 1/0274* (2013.01); *G06F 17/30241* (2013.01); *G06F 17/30321* (2013.01); *G06F 17/30477* (2013.01)

(56) References Cited

U.S. PATENT DOCUMENTS

| | | | |
|---|---|---|---|
| 8,078,394 B2 | 12/2011 | Wang et al. | |
| 8,798,897 B2 | 8/2014 | Fei et al. | |
| 8,825,359 B1 | 9/2014 | Wolf | |
| 8,898,185 B2 | 11/2014 | Albers et al. | |
| 2004/0095343 A1* | 5/2004 | Forest | G06T 17/20 345/419 |
| 2008/0071466 A1* | 3/2008 | Downs | G08G 1/0104 701/117 |
| 2008/0262721 A1 | 10/2008 | Guo et al. | |
| 2009/0088962 A1 | 4/2009 | Jones | |
| 2009/0119003 A1 | 5/2009 | Takeda | |
| 2009/0138188 A1 | 5/2009 | Kores et al. | |
| 2009/0327342 A1* | 12/2009 | Xiao | G06F 17/30241 |
| 2010/0287207 A1 | 11/2010 | Motoyama | |
| 2011/0125402 A1 | 5/2011 | Mitsugi et al. | |
| 2012/0237081 A1* | 9/2012 | Datta | G06K 9/00778 382/103 |
| 2012/0296560 A1* | 11/2012 | Zheng | G08G 1/0112 701/119 |
| 2013/0297207 A1 | 11/2013 | Mason et al. | |
| 2014/0278047 A1* | 9/2014 | Bahl | G08G 1/164 701/301 |
| 2014/0297167 A1 | 10/2014 | Duan et al. | |
| 2015/0039217 A1* | 2/2015 | Deshpande | G08G 1/20 701/300 |
| 2015/0046452 A1* | 2/2015 | Agrawal | G06F 17/30241 707/737 |
| 2015/0145782 A1* | 5/2015 | Brown | G06F 3/0416 345/173 |
| 2015/0198449 A1 | 7/2015 | Okude et al. | |
| 2015/0300835 A1 | 10/2015 | Fowe et al. | |
| 2016/0092621 A1* | 3/2016 | Hu | G01C 21/32 703/6 |
| 2016/0313132 A1* | 10/2016 | Larroy | G01C 21/34 |
| 2017/0132238 A1* | 5/2017 | Lee | G06F 17/3097 |

OTHER PUBLICATIONS

Chi et al.; "Spatial-temporal Indexing Research based on Road Network: Improved-MON-tree"; International Journal of Hybrid Information Technology; 2014; pp. 407-416; vol. 7, No. 4; SERSC.

Cudre-Mauroux et al.; "TrajStore: An Adaptive Storage System for Very Large Trajectory Data Sets"; 2010 IEEE 26th International Conference on Data Engineering (ICDE); 2010; pp. 109-120; Institute of Electrical and Electronics Engineers.

Ke et al.; "A Hybrid Spatio-Temporal Data Indexing Method for Trajectory Databases"; Sensors 2014, 14; Jul. 21, 2014; pp. 12990-13005.

Lange et al.; "Scalable Processing of Trajectory-Based Queries in Space-Partitioned Moving Objects Databases"; ACM GIS '08; Nov. 5-7, 2008; pp. 1-10; ACM; Irvine, Ca, USA.

Pfoser et al.; "Novel Approaches to the Indexing of Moving Object Trajectories"; Proceedings of the 26th International Conference on Very Large Databases; Sep. 10-14, 2000; pp. 395-406; Cairo, Egypt.

Duan et al.; U.S. Appl. No. 14/791,576, filed Jul. 6, 2015; Entitled "Hybrid Road Network and Grid Based Spatial-Temporal Indexing Under Missing Road Links".

Duan et al.; U.S. Appl. No. 15/055,681, filed Feb. 29, 2016; Entitled "Hybrid Road Network and Grid Based Spatial-Temporal Indexing Under Missing Road Links".

List of IBM Patents or Patent Applications Treated As Related; Dated Sep. 6, 2016; 2 pages.

Duan et al., Entitled "Hybrid Road Network and Grid Based Spatial-Temporal Indexing Under Missing Road Links", U.S. Appl. No. 15/355,395, filed Nov. 18, 2016, pp. 1-18.

Duan et al, Entitled "Hybrid Road Network and Grid Based Spatial-Temporal Indexing Under Missing Road Links", U.S. Appl. No. 15/355,539, filed Nov. 18, 2016, pp. 1-18.

IBM Appendix P.:"List of IBM Patents or Patent Applications to Be Treated As Related", Dated Nov. 18, 2016, 2 pages.

Wang, et al., "A Flexible Spatio-temporal Indexing Scheme for Large-scale GPS Track Retrieval", The Ninth International Conference on Mobile Data Management (mdm 2008), Apr. 27-30, 2008, 8 pages.

Chakka, et al., "Indexing Large Trajectory Data Sets With SETI", In Online proceedings of the 1st Biennial Conference on Innovative Data Systems Research, CIDR, 2003, 12 pages, <pages.cs.wisc.edu/~ace/papers/seti.pdf>.

* cited by examiner

310

| MO TID | LinkID | Start Time | End Time |
|---|---|---|---|
| MO T1 | L5 | Ymd:20:00:00 | Ymd:20:00:30 |
| MO T1 | L6 | Ymd:20:01:00 | Ymd:20:01:30 |
| MO T1 | L9 | Ymd:20:01:30 | Ymd:20:02:00 |
| MO T1 | L10 | ... | ... |
| MO T1 | L11 | ... | ... |
| MO T1 | L12 | ... | ... |
| ... | ... | ... | ... |
| MO T3 | L5 | Ymd:20:01:00 | Ymd:20:02:30 |
| MO T3 | L14 | | |
| MO T3 | L3 | ... | ... |
| MO T3 | L4 | ... | ... |

| MO TID | Spatial Cell Bundling | Start Time | End Time | Entry Distance | Leave Distance | Material Statistics (optional) |
|---|---|---|---|---|---|---|
| MO T1 | LB3 | ... | ... | 0 | 0.63 | MO T1 L5 L6 |
| MO T1 | LB9 | | | ... | ... | MO T1 L9 |
| MO T1 | LB6 | | | ... | ... | MO T1 L10 L11 L12 |
| ... | ... | | | ... | ... | ... |
| MO T3 | LB3 | ... | ... | ... | ... | MO T3 L5 |
| MO T3 | Grid1 | | | ... | ... | MO T3 X11 |
| MO T3 | LB2 | | | ... | ... | MO T3 L3 L4 |
| ... | ... | | | ... | ... | ... |

FIG. 3D

HYBRID ROAD NETWORK AND GRID BASED SPATIAL-TEMPORAL INDEXING UNDER MISSING ROAD LINKS

BACKGROUND OF THE INVENTION

The present invention relates generally to the field of indexing big data, and more particularly to a hybrid road network and grid based spatial temporal indexing for trajectory data under missing road links.

A large volume of trajectory data from global positioning systems is continuously generated by moving objects (MOs), such as vehicles. The availability of global positioning systems (i.e., GPS) has led to a multitude of location-based services, which not only detect the current positions of MOs, but also the past positions of MOs (i.e., the trajectories of the MOs).

SUMMARY

According to one embodiment of the present invention, a method for indexing map data is provided, the method comprising: from a set of received trajectory points, determining, by one or more computer processors, whether each received trajectory point from the set of received trajectory points is associated with a road link of a map; building, by one or more processors, from the set of received trajectory points, a hybrid index, wherein the hybrid index comprises spatial cells, and wherein the spatial cells comprise a road link and a grid; and receiving, by one or more processors, a query, wherein the query comprises an area of the map.

According to another embodiment of the present invention, a computer program product is provided, the computer program product comprising: a computer readable storage medium and program instructions stored on the computer readable storage medium, the program instructions comprising: program instructions to, from a set of received trajectory points, determine whether each received trajectory point from the set of received trajectory points is associated with a road link of a map; program instructions to build, from the set of received trajectory points, a hybrid index, wherein the hybrid index comprises spatial cells, and wherein the spatial cells comprise a road link and a grid; and program instructions to receive a query, wherein the query comprises an area of the map.

According to another embodiment of the present invention, a computer system is provided, the computer system comprising: one or more computer processors; one or more computer readable storage media; program instructions stored on the one or more computer readable storage media for execution by at least one of the one or more processors, the program instructions comprising: program instructions to, from a set of received trajectory points, determine whether each received trajectory point from the set of received trajectory points is associated with a road link of a map; program instructions to build, from the set of received trajectory points, a hybrid index, wherein the hybrid index comprises spatial cells, and wherein the spatial cells comprise a road link and a grid; and program instructions to receive a query, wherein the query comprises an area of the map.

BRIEF DESCRIPTION OF THE DRAWINGS

FIGS. 3C and 3D depict example data charts of map-matched trajectory series points data and hybrid indexing, respectively, in accordance with an embodiment of the present invention;

DETAILED DESCRIPTION

A large volume of trajectory data from global positioning systems is continuously generated by moving objects (MOs), such as vehicles. For example, if one GPS data point per 10 seconds was collected over the span of 10 hours for 100,000 vehicles, then the trajectory data size of one year is 129,600,000,000 records. As the volume of data continues to increase, organization of the volumes of trajectory data may be necessary, and various methods to further provide optimized indexing have been proposed. Further, there are often missing links in the data collection, as the real world roads are often changing and sometimes small, leading to high error rates. Embodiments of the present invention provide methods and systems for an efficient hybrid road network and grid based spatial-temporal indexing mechanism for big trajectory data, which uses grid based indexing to account for missing road links and uses a dynamic link bundling mechanism to account for low indexing compression rates.

Figure 1:
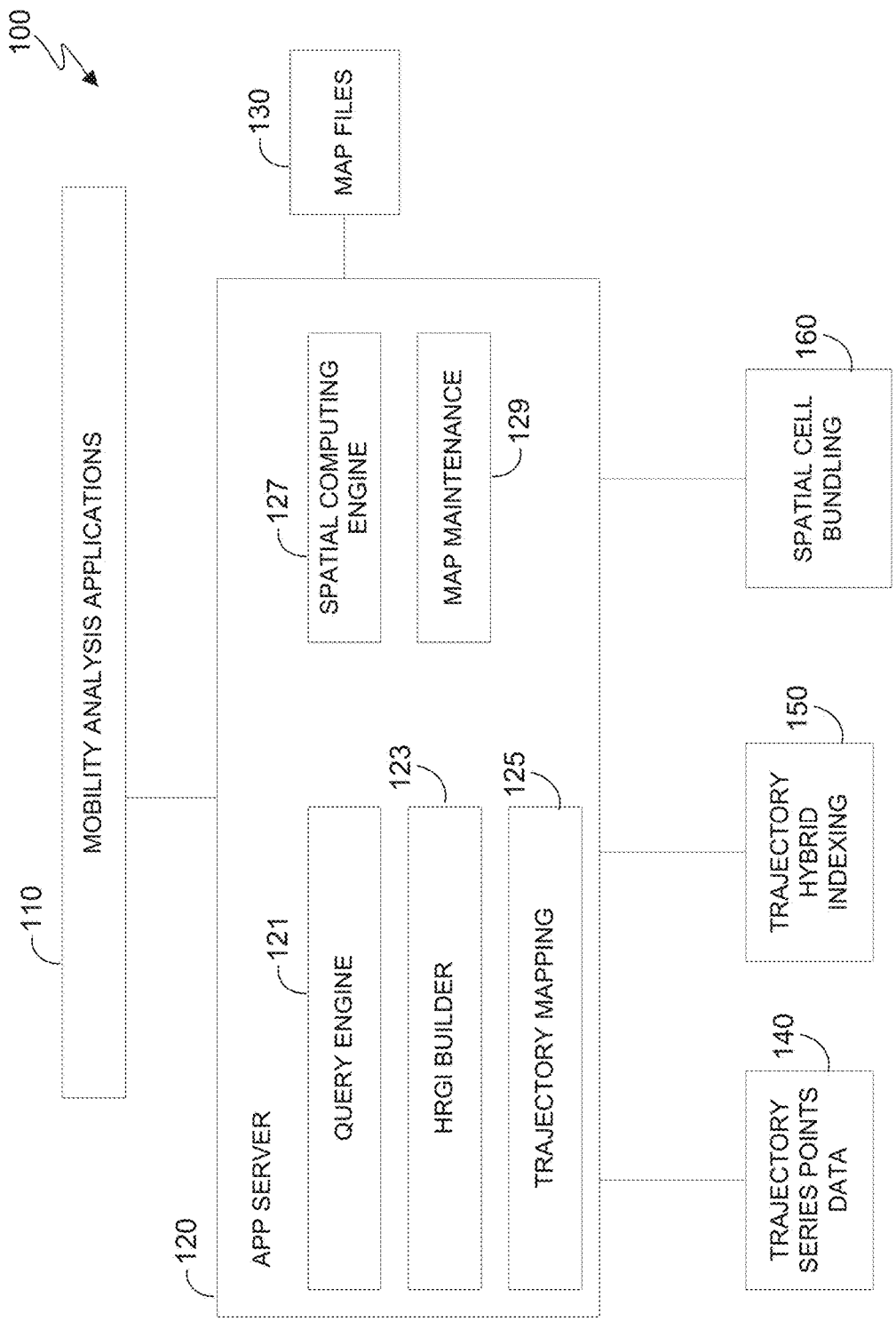
FIG. 1 depicts a functional block diagram of a hybrid road network and grid based indexing (HRGI) architecture, in accordance with an embodiment of the present invention.

The present invention will now be described in detail with reference to the Figures. FIG. 1 depicts a functional block diagram illustrating a hybrid road network and grid based indexing (HRGI) architecture, generally designated HRGI architecture 100, in accordance with an embodiment of the present invention. Modifications to HRGI architecture 100 may be made by those skilled in the art without departing from the scope of the invention as recited by the claims. In an exemplary embodiment, HRGI architecture 100 includes one or more mobility analysis applications 110, application (APP) server 120, map files 130, trajectory series points data 140, trajectory hybrid indexing 150, and spatial cell bundling 160.

Mobility analysis applications 110 receive trajectory data from query engine 121. In this exemplary embodiment, mobility analysis applications 110 are a type of consumer of the HRGI system, and are external to the APP server 120.

APP server 120 includes query engine 121, HRGI builder 123, trajectory mapping 125, spatial computing engine 127, and map maintenance 129. APP server 120 is a software framework which supports the execution of procedures for supporting application operations between users and back-end applications or databases.

Query engine 121 makes a query within a specified scope, and then returns the results of the specified query.

HRGI builder 123 builds the hybrid index using trajectory series points data 140. Subsequent to building the hybrid index, the information is input into trajectory hybrid indexing 150, which includes such information as a moving object (MO) identification, a spatial cell identification, a start time, an end time, and a determined trajectory segment identification.

Trajectory mapping 125 receives trajectory series points data 140, and maps the data to matching road links within a map. Trajectory series points data 140 includes data information such as: a moving object identification, a timestamp of the moving object, a longitude coordinate and latitude coordinate of the data, a spatial cell identification (if any), and a distance (if any).

Spatial computing engine 127 is a support engine for HRGI architecture 100. In this exemplary embodiment, spatial computing engine 127 reads road network information from map files 130 and builds the road network model and caches the model in the memory. Spatial computing engine 127 executes certain spatial related computations (e.g., makes judgements as to intersections of road links, certain polygons/shapes/circles, etc.).

Map maintenance 129 is an engine which maintains map data based on the collected trajectory segmentation missing road links. Map maintenance 129 is a background daemon application, which can be triggered by a certain time period or rule (e.g., when the trajectory segmentations around a certain grid reach a predefined threshold value). The spatial cell bundling is updated using files from spatial cell bundling 160, which includes information such as bundled cells and grids, as well as the corresponding trajectory segment identifications and grid identifications.

Figure 2A:
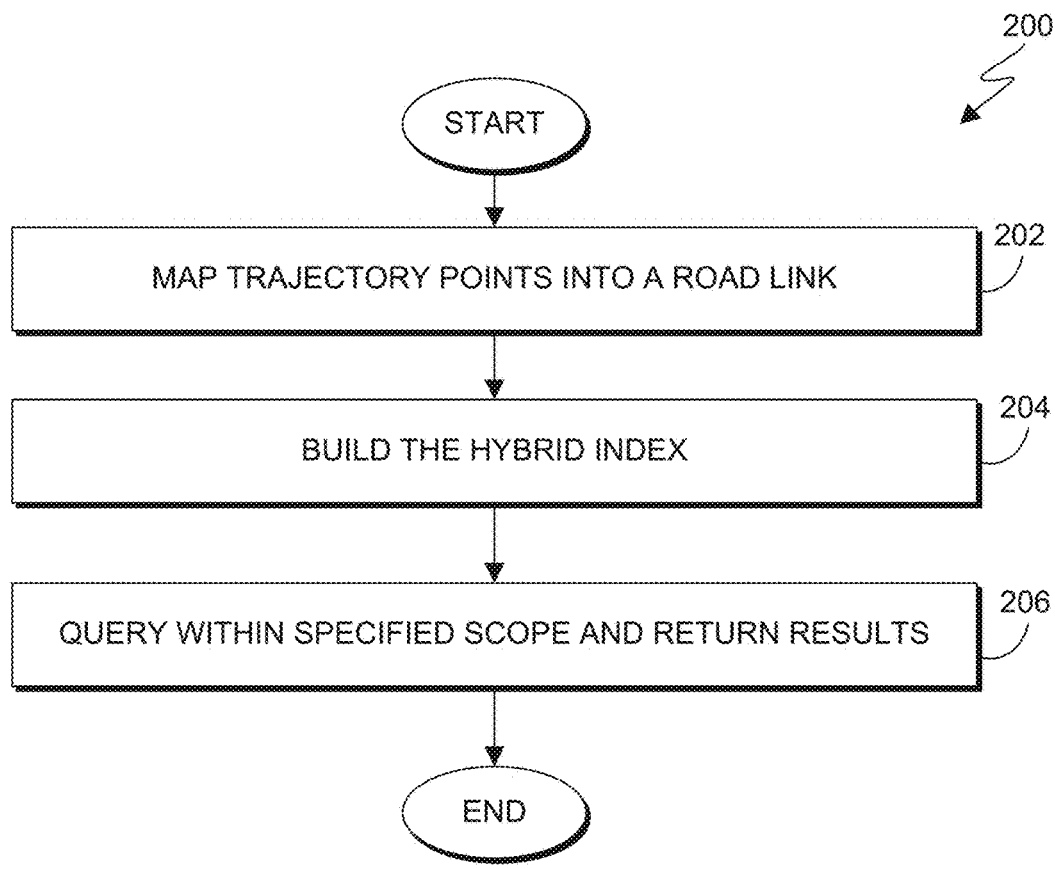
FIG. 2A depicts a flowchart illustrating operational steps for indexing trajectory data using uniform spatial cells, in accordance with an embodiment of the present invention.

FIG. 2A depicts a flowchart 200 illustrating operational steps for indexing trajectory data using uniform spatial cells, in accordance with an embodiment of the present invention.

In step 202, after receiving a set of trajectory series points data 140, trajectory mapping 125 maps the received trajectory points into their matching road links of a map. In this exemplary embodiment, if trajectory mapping 125 does not find a matching road link for a certain trajectory point, then that trajectory point is considered null.

In step 204, HRGI builder 123 builds the hybrid index. In this exemplary embodiment, when building the hybrid index, if the link identification is not null (i.e., 'mapped'), then the current link identification is used as the spatial cell. If the link identification is null (i.e., not mapped), then a grid is used as the spatial cell. In this case, the grid identification is calculated using the longitude and latitude of the GPS point.

In step 206, query engine 121 makes a query within a specified scope, and then returns the results of the specified query. In this exemplary embodiment, query engine 121 first finds all of the spatial cells (i.e., grid cells and link identifications) which intersect with the scope of the query. The intersecting spatial cells are then scanned from the indexing, and the results are returned. If the spatial cell type is a grid cell, then further filtering is performed through spatial computing (i.e., spatial computing engine 127), in which the actual intersection among the grid cells is determined using the trajectory data.

Figure 2B:
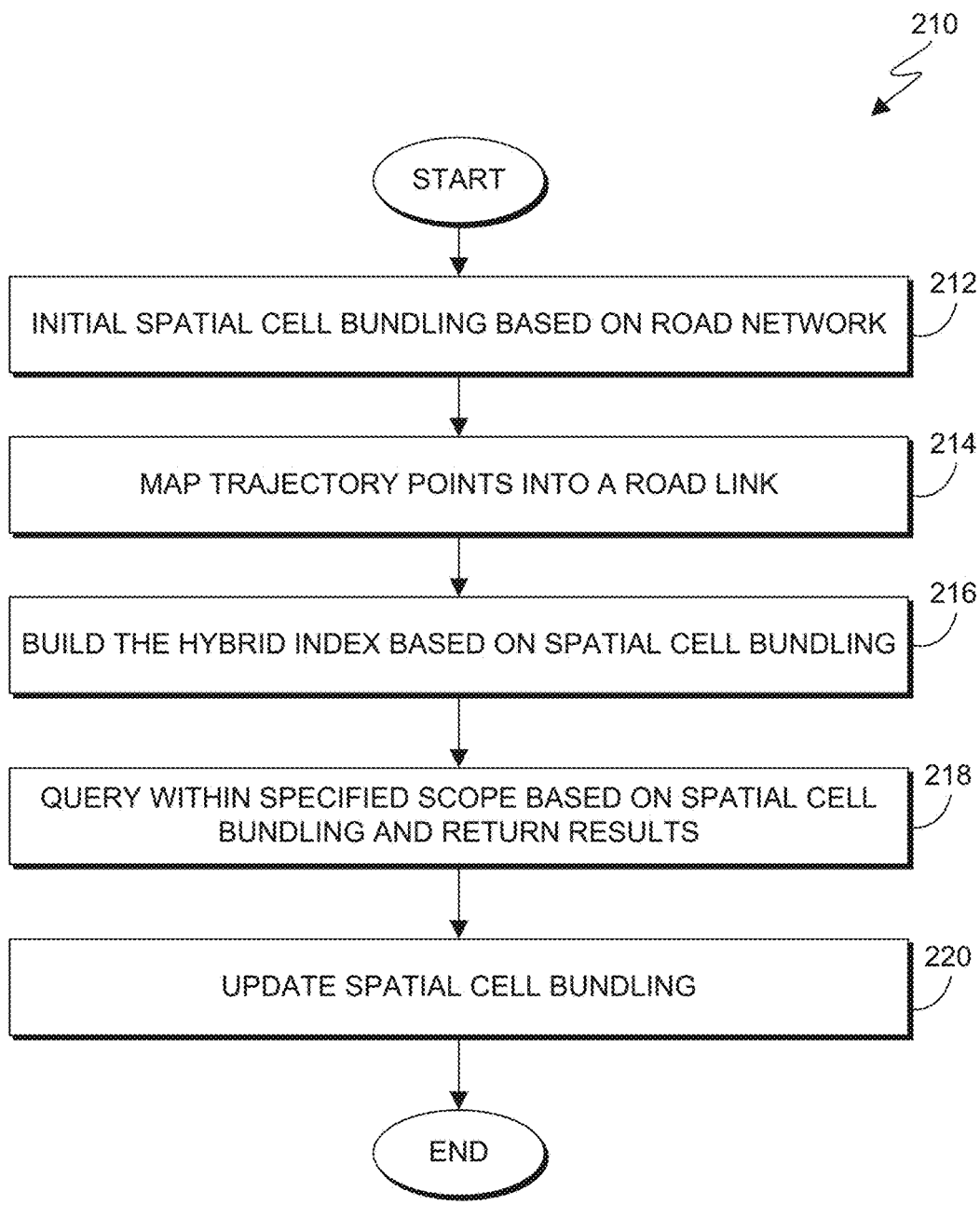
FIG. 2B depicts a flowchart illustrating operational steps for indexing trajectory data using dynamic spatial cells, in accordance with an embodiment of the present invention.

FIG. 2B depicts a flowchart 210 illustrating operational steps for indexing trajectory data using dynamic spatial cells, in accordance with an embodiment of the present invention.

In step 212, a mechanism to bundle road network features and trajectory distribution features based on dynamic spatial cells (i.e., links and grids) is performed. Bundling of the road networks decreases the index record number, in order to keep the record size of the index data less than the entire size of the received GPS data. In the initial phase, the road network features, for example, street names, are used to build the link bundle, while hierarchical grid bundling is used to build the grid bundles, by ensuring that the trajectory density in each spatial cell is equal. For example, in order to obtain uniform density throughout a map area, the areas depicting suburban areas may have larger spatial scale grids and/or link bundling than an urban area on the same map, which may have smaller spatial scale grids and/or link bundling (as it is a higher density area than the suburban area). During the runtime phase, the trajectory distribution feature (e.g., trajectory density) is used to further dynamically update the spatial cell bundle (described further in step 220).

In step 214, after receiving a set of trajectory series points data 140, trajectory mapping 125 maps the trajectory points into their matching road links of a map. In this exemplary embodiment, if trajectory mapping 125 does not find a matching road link for a certain trajectory point, then that trajectory point is considered null (i.e., 'null' value entered into the point data spatial cell field). For the matching road links, the spatial cell value is entered into the point data spatial cell field.

In step 216, HRGI builder 123 builds the hybrid index based on the spatial cell bundling. In this exemplary embodiment, when building the hybrid index, the points data in time sequence of one moving object are first input. The first point is read as the current point, and the initial variables are set according to this point. If there are more data points to calculate, then the next point is obtained and set as the current point, and calculations performed. The last cell and the current point data are compared to determine whether there is a change. If there is a change, then the hybrid network grid index is built using the entry point and leave point and the spatial cells are updated. If there is no change between the last cell and the current cell, then the leave point is set as the current point, and the last cell is set as the current cell, and the calculations continue on the points data.

In step 218, query engine 121 makes a query within a specified scope based on the spatial cell bundling, and then returns the results of the specified query. In this exemplary embodiment, query engine 121 first finds all of the spatial cells (i.e., grid cells and link identifications) which intersect with the scope of the query. The corresponding spatial cell bundles and intersection link distances are then identified and calculated. The intersecting spatial cells bundles are then determined from the indexing table and the temporal intersection within the query time window. The corresponding indexing items results from these conditions are then returned. If the spatial cell type is a link, filtering is performed using the entry distance and the leave distance, as above (i.e., linear computing). If the spatial cell type is a grid cell, then further filtering is performed through spatial computing, in which the actual intersection among the grid cells is determined using the trajectory data. The filtered results are then returned.

In step 220, the spatial cell bundling is updated during runtime. In this exemplary embodiment, the trajectory density and a trajectory pattern is used to dynamically optimize the link bundling. The trajectory pattern based update ensures the spatial cell bundling follow up trajectory pattern. The trajectory density feature is used to ensure that the trajectory densities in each spatial cell area are equal, according to the following metric:

$$\text{Costarea}(q) \sim \sum_{cell} P(q \cap \text{cell}) \left| \frac{(cellw \times cellh)\mathcal{D}}{pagesize} \right| \quad \text{(Equation 1)}$$

For example, if the trajectory density is sparse, then the scale of the spatial cell bundling should be bigger, while if the trajectory density is larger, then the scale of the spatial cell bundling should be smaller. To determine the trajectory density, the trajectory frequency is multiplied by the GPS sample rate. The compression rate (i.e., storage) is balanced against the hit ratio (i.e., filtering ratio in runtime query) according to actual requirements. For example, if the compression rate is higher, then the scale of the spatial cell bundling should be bigger, but the hit ration is low; while if the hit ration is higher, then the scale of the spatial cell bundling should be smaller, but the compression rate is lower. After the spatial cell bundling is updated, the HRGI builder 123 is re-run to update the corresponding index table items.

Accordingly, by performing the operational steps of FIG. 2A and FIG. 2B an efficient method for indexing a hybrid road network and grid based spatial temporal trajectory is performed. Through spatial computing for the grid-based trajectory segments, missing road links can be accounted for, while maintaining efficiency and accuracy of the indexing system.

Figure 3A:
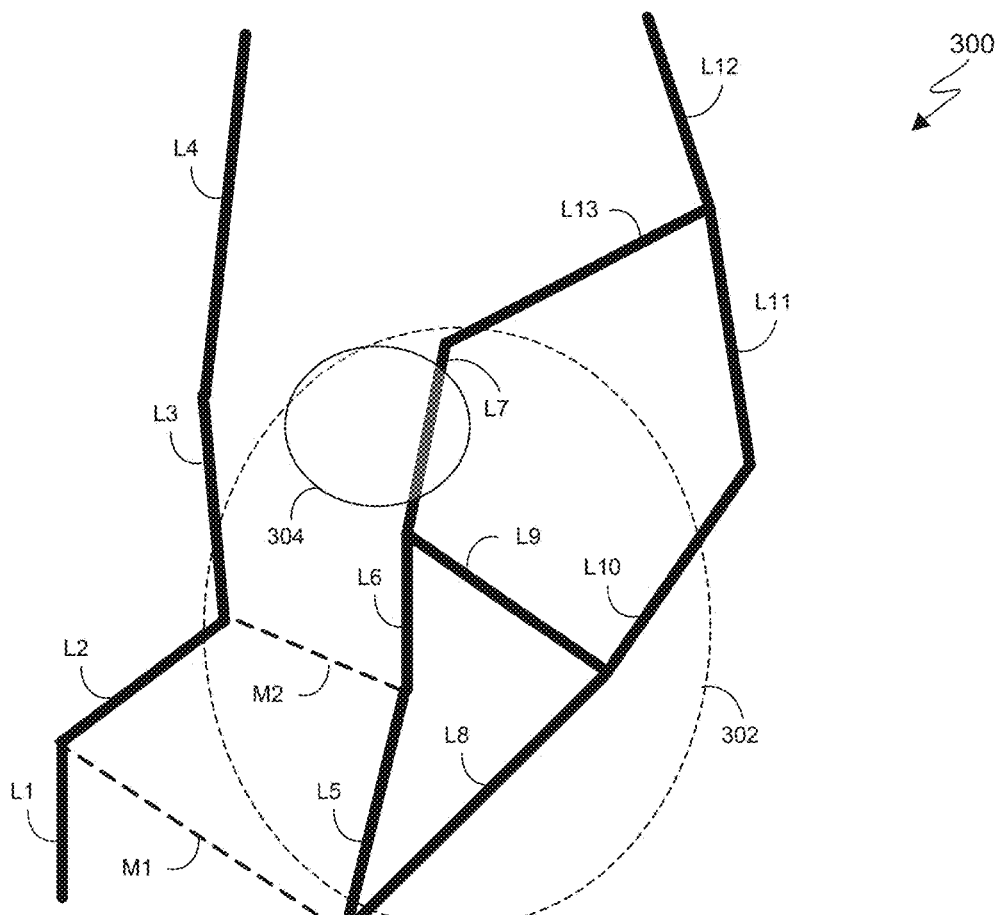
FIG. 3A depicts an example map with a link based index and missing links, in accordance with an embodiment of the present invention.

FIG. 3A depicts an example map with a link based index and missing links, in accordance with an embodiment of the present invention.

FIG. 3A depicts an example map 300 with road link segments for four different moving objects (MOs) trajectories. For example, a first MO has a trajectory of L5, L6, L9, L10, L11, and L12; a second MO has a trajectory of L1, L2, L14, L6, L7, and L13; a third MO has a trajectory of L5, L14, L3, and L4; and a fourth MO has a trajectory of L1, L15, L8, L10, L11, and L12. After a point of interest scope (i.e., scope 304) is identified (i.e., step 206 of FIG. 2A), each link segment which intersects with scope 304 during the specified time window (as well as its corresponding trajectory segment) is identified. For example, link segment L7 intersects with scope 304 in FIG. 3A. Missing links M1 and M2 do not have data associated with them. Selection 302 is described in further detail with respect to FIG. 3B.

Figure 3B:
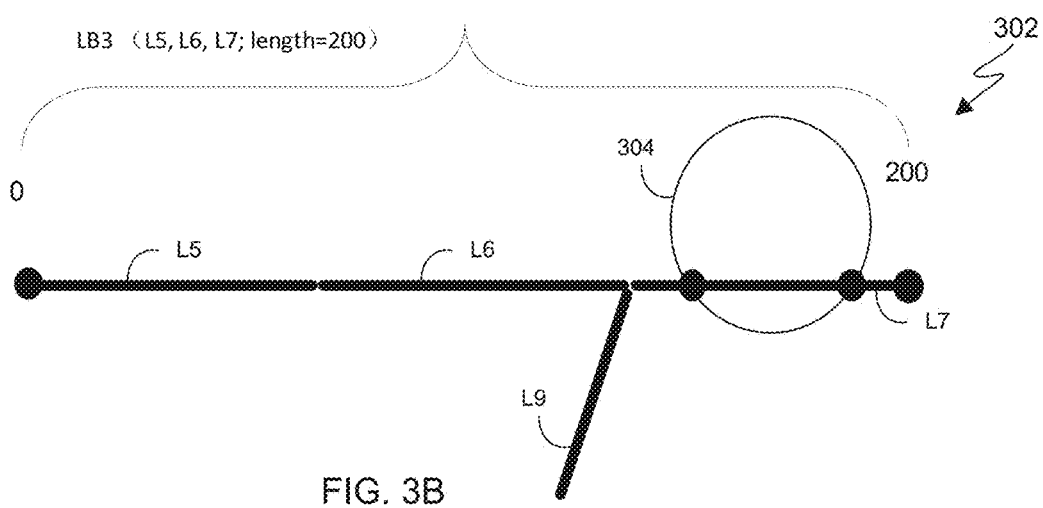
FIG. 3B depicts an example of link bundling of a group of road links, in accordance with an embodiment of the present invention.

FIG. 3B depicts an example of link bundling of a group of road links from selection 302 of FIG. 3A, in accordance with an embodiment of the present invention.

A group of link segments captured in selection 302 of FIG. 3A are depicted as bundled segments in FIG. 3B. Link segments L5, L6, and L7 are bundled together, with a total length of 200 (i.e., 100%). From this bundling, the points of intersection with scope 304 can be calculated. The other link segments of FIG. 3A are bundled together in a similar manner (not depicted).

FIGS. 3C and 3D depict example data charts 310 and 320 of map-matched trajectory series points data and hybrid indexing, respectively, in accordance with an embodiment of the present invention.

In FIG. 3C, data chart 310 depicts the map-matched trajectory series points data for the example map 300 of FIG. 3A. The data for each moving object (i.e., MO T1, MO T3, etc.) is recorded, such as a link identification for each MO, as well as the start and end times for each MO. In the example of FIG. 3C, the link segment L14 (MO T3) is a missing link, and there is no start and end time data associated with this link.

Figure 4:
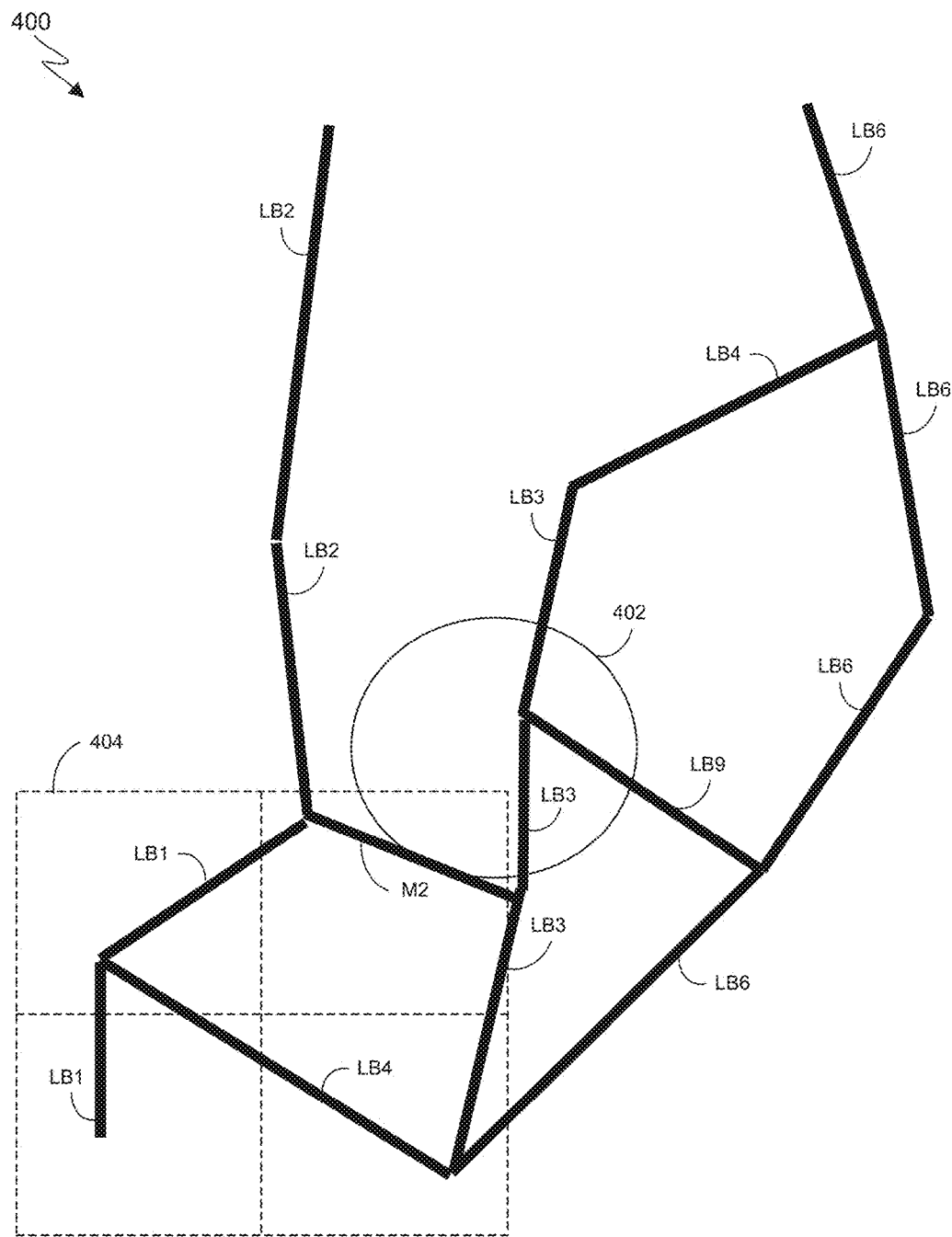
FIG. 4 depicts an example of a dynamic hybrid grid and road network based bundling mechanism, in accordance with an embodiment of the present invention.

In FIG. 3D, data chart 320 depicts the hybrid index bundling data for the example map 400 of FIG. 4. The data for each bundled link is calculated and recorded. For example, the spatial cell bundling, LB3, is a bundling of link segments L5 and L6 from FIG. 3A, with an entry and leave distance recorded. Similar data is calculated and recorded for each known link segment. The missing link segment, L14, from FIG. 3C, is bundled as a grid (further depicted in FIG. 4).

FIG. 4 depicts an example of a dynamic hybrid grid and road network based bundling mechanism, in accordance with an embodiment of the present invention.

As depicted in FIG. 4, point of interest scope 402 intersects with some link segments from the bundled link segments, including the missing link segment, M2. Grid bundling is done around the missing link segment, M2, in order to account for this missing data. As described in step 212 and 220 of FIG. 2B, the density in each grid is calculated to ensure even distribution of density throughout each grid.

Figure 5:
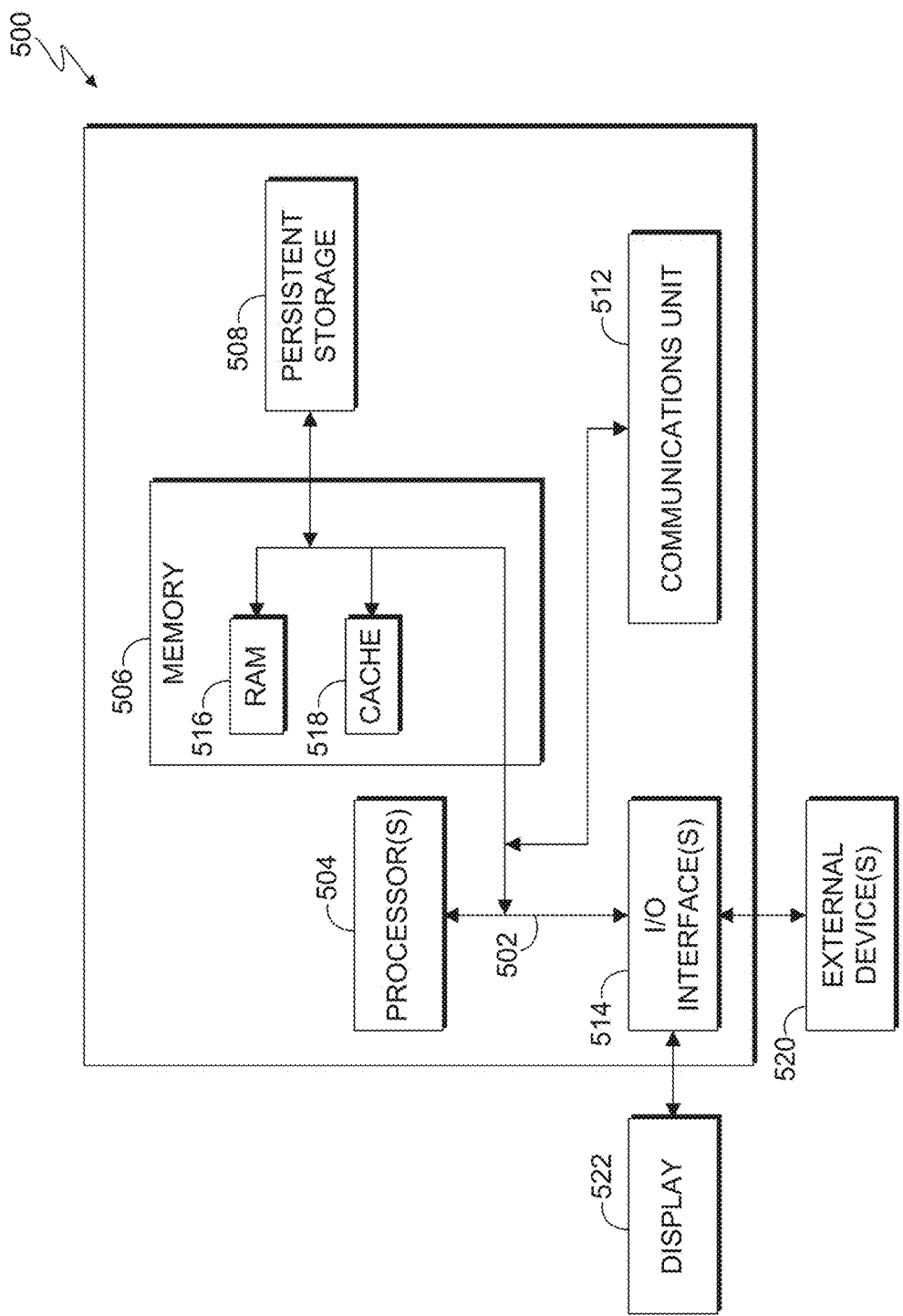
FIG. 5 depicts a block diagram of internal and external components of a device, in accordance with an embodiment of the present invention.

FIG. 5 depicts a block diagram of device 500, which is representative of various components of FIG. 1, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Device 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 516 and cache memory 518. In general, memory 506 can include any suitable volatile or non-volatile computer readable storage media.

Program files are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links. Applications and/or programs may be downloaded to persistent storage 508 through communications unit 512.

I/O interface(s) 514 allows for input and output of data with other devices that may be connected to device 500. For example, I/O interface 514 may provide a connection to external device(s) 520 such as a keyboard, keypad, a touch screen, and/or some other suitable input device. External device(s) 520 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 514. I/O interface(s) 514 also connect to a display 522.

Display 522 provides a mechanism to display data to a user and may be, for example, a computer monitor or an incorporated display screen, such as is used in tablet computers and smart phones.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for indexing map data, the method comprising:
    from a set of trajectory points received from a global positioning system (GPS), determining, by one or more computer processors, whether each received trajectory point from the set of received trajectory points is associated with a road link of a map;
        building, by one or more processors, from the set of received trajectory points, a hybrid index comprising spatial cells that are categorized as either a road link or a grid, wherein the spatial cells are categorized as a road link if the spatial cells match a known road, and wherein the spatial cells are categorized as a grid if the spatial cells do not match a known road;
        responsive to receiving a query for an area of the map, identifying, by one or more processors, an intersection between spatial cells that are categorized as a grid that are within the area of the map specified by the query;
        identifying, by one or more processors, missing roads from the identified intersection of the spatial cells categorized as a grid;
        dynamically updating the spatial cells using a trajectory density and trajectory pattern to ensure that trajectory densities of each spatial cell of the spatial cells are equal; and
        displaying, by one or more processors, output data associated with the built hybrid index.

2. The method of claim 1, further comprising:
    responsive to determining that a received trajectory point from the set of received trajectory points is associated with a road link of the map, using the road link for a spatial cell; and
    responsive to determining that a received trajectory point from the set of received trajectory points is not associated with a road link of the map, using the grid for the spatial cell.

3. The method of claim 1, further comprising:
    combining, by one or more processors, more than one road link to form a bundled road link.

4. The method of claim 2, further comprising:
    combining, by one or more processors, at least one grid, to form a bundled grid.

5. The method of claim 3, further comprising:
    updating, by one or more processors, the bundled road link, based, at least in part, on a road link feature and a trajectory feature, wherein the trajectory feature comprises: a trajectory pattern and a trajectory density.

6. A computer program product comprising:
    a computer readable storage medium and program instructions stored on the computer readable storage medium, the program instructions comprising:
    program instructions to, from a set of received trajectory points, determine whether each received trajectory point from the set of received trajectory points is associated with a road link of a map;
    program instructions to build from the set of received trajectory points, a hybrid index comprising spatial cells that are categorized as either a road link or a grid, wherein the spatial cells are categorized as a road link if the spatial cells match a known road, and wherein the spatial cells are categorized as a grid if the spatial cells do not match a known road;
    program instructions to responsive to receiving a query for an area of the map, identify an intersection between spatial cells that are categorized as a grid that are within the area of the map specified by the query;
    program instructions to identify missing roads from the identified intersection of the spatial cells categorized as a grid;
    program instructions to dynamically update the spatial cells using a trajectory density and trajectory pattern to ensure that trajectory densities of each spatial cell of the spatial cells are equal; and
    program instructions to display output data associated with the built hybrid index.

7. The computer program product of claim 6, further comprising:
    program instructions to, responsive to determining that a received trajectory point from the set of received trajectory points is associated with a road link of the map, use the road link for a spatial cell; and
    program instructions to, responsive to determining that a received trajectory point from the set of received trajectory points is not associated with a road link of the map, use the grid for the spatial cell.

8. The computer program product of claim 6, further comprising:
    program instructions to combine more than one road link to form a bundled road link.

9. The computer program product of claim 7, further comprising:
    program instructions to combine at least one grid, to form a bundled grid.

10. The computer program product of claim 8, further comprising:
    program instructions to update the bundled road link, based, at least in part, on a road link feature and a trajectory feature, wherein the trajectory feature comprises: a trajectory pattern and a trajectory density.

* * * * *